(12) United States Patent
Jacobs

(10) Patent No.: US 7,210,805 B1
(45) Date of Patent: May 1, 2007

(54) DETACHABLE TRAILER-WINCH MIRROR APPARATUS

(76) Inventor: Marty Jacobs, 817 Mount Pleasant Rd., Kelso, WA (US) 98626

( * ) Notice: Subject to any disclaimer, the term of this patent is extended or adjusted under 35 U.S.C. 154(b) by 37 days.

(21) Appl. No.: 11/087,441

(22) Filed: Mar. 24, 2005

(51) Int. Cl.
G02B 7/182 (2006.01)
A47G 1/24 (2006.01)

(52) U.S. Cl. ..................... 359/872; 248/476
(58) Field of Classification Search ............... 359/841, 359/844, 842, 871, 872, 881; 248/476, 482
See application file for complete search history.

(56) References Cited

U.S. PATENT DOCUMENTS

| 2,472,438 | A | | 6/1949 | Price |
| 4,896,897 | A | * | 1/1990 | Wilhelm ..................... 280/655 |
| 4,905,376 | A | | 3/1990 | Neeley |
| 4,925,287 | A | | 5/1990 | Lord et al. |
| 5,111,342 | A | * | 5/1992 | Quesada ..................... 359/872 |
| 5,625,500 | A | | 4/1997 | Ackerman |
| 5,784,213 | A | * | 7/1998 | Howard ..................... 359/872 |
| 5,971,555 | A | * | 10/1999 | Wilcox et al. .............. 359/872 |
| 6,062,697 | A | | 5/2000 | Bryant et al. |
| 6,102,423 | A | * | 8/2000 | Beck et al. ................. 280/477 |
| D474,432 | S | | 5/2003 | Good |
| 6,619,685 | B2 | | 9/2003 | Teague |

* cited by examiner

Primary Examiner—Alessandro Amari

(57) ABSTRACT

A detachable mirror apparatus includes a U-shaped frame including a primary female section and a pair of male leg sections engaged with the primary section. Each leg section has a linear shape. A mechanism is included for removably securing the frame to a selected portion of the vehicle. The apparatus further includes a mechanism for identifying the object lying within the second line of sight by reflecting an image of the object onto the first line of sight such that the operator can identify the object while seated within the vehicle. Such an identifying mechanism is selectively positional at various angles offset from a vertical plane.

15 Claims, 3 Drawing Sheets

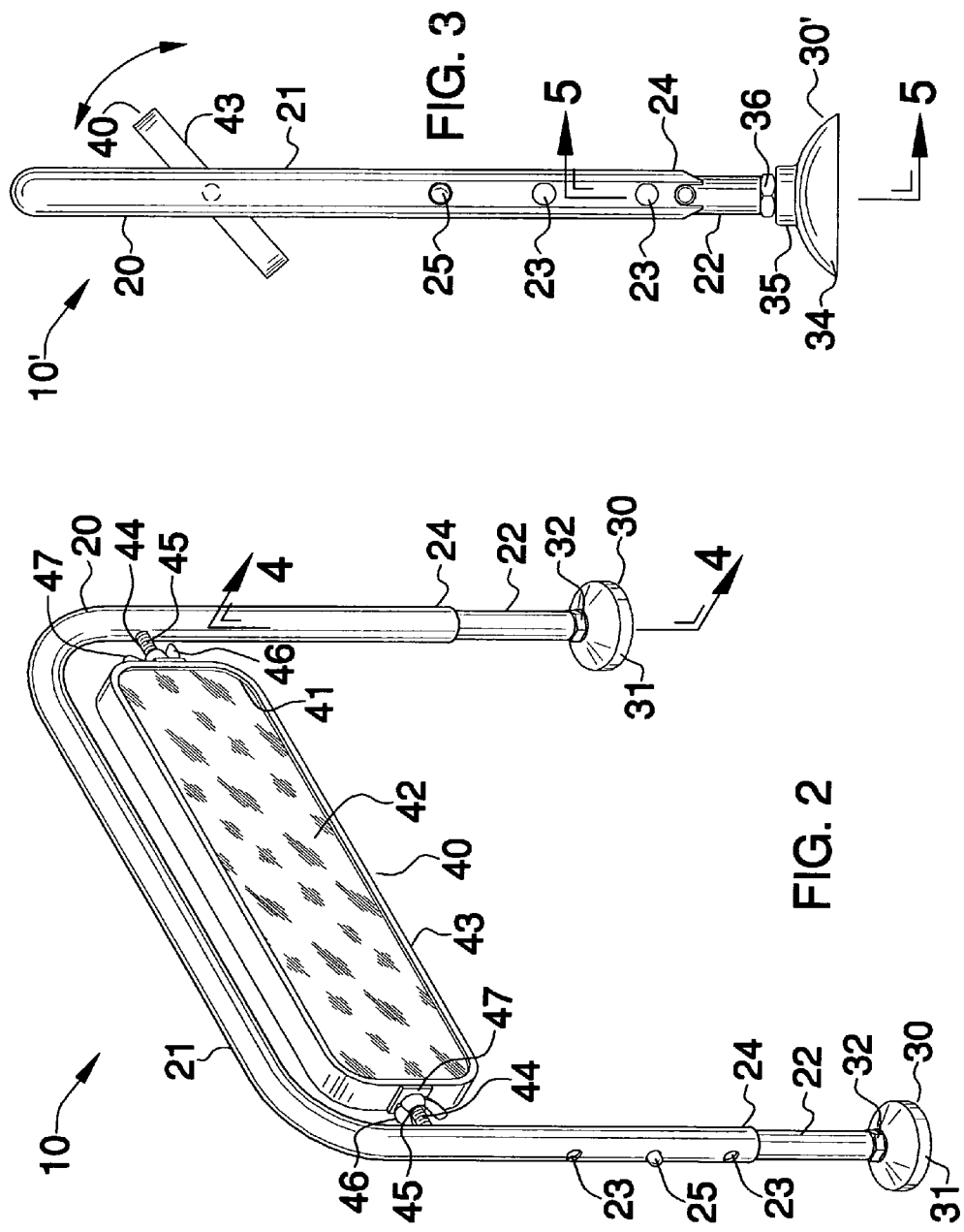

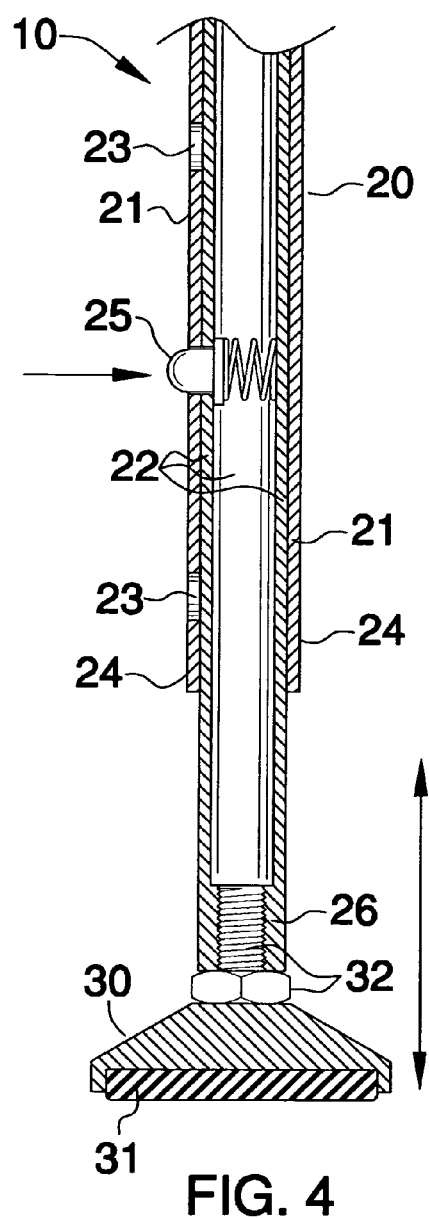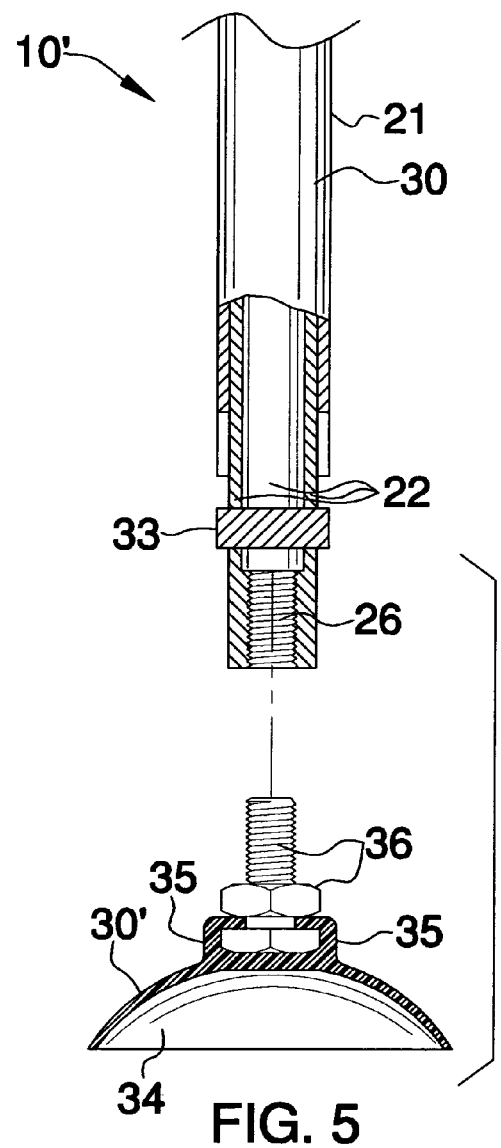

DETACHABLE TRAILER-WINCH MIRROR APPARATUS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a detachable mirror apparatus and, more particularly, to a detachable trailer winch mirror apparatus for assisting an operator to view an object disposed along a secondary line of sight offset from the operator's primary line of sight.

2. Prior Art

The use of electric winches is well known in the prior art. A winch is normally located towards the bottom of a vehicle's front end. As such, it is virtually impossible to view the winch while seated in the driver's seat. This may become a troublesome issues, since an operator located in a vehicle may not be able to tell when the winch is not functioning properly, thus resulting in damage to this expensive piece of equipment.

Electrical winches are not the only vehicle attachments that are difficult to view from the driver's seat. A variety of hitches are available for connecting a trailer to a tow vehicle. Most of these hitches consist of a hitch member rigidly secured to the lower portion of the tow vehicle and a mating hitch member rigidly secured to the lower portion of the trailer.

Since such hitch members are affixed to the lower portions of their respective vehicles, the person operating the tow vehicle may find it difficult, if not impossible, to view the hitch members during the alignment process. Consequently, the tow vehicle operator must often make numerous coupling attempts before the trailer and tow vehicle are properly aligned for coupling. This may include the process of the driver backing up a few feet, stopping, and getting out and walking around to the rear of the vehicle in order to check the alignment.

As such, it is advantageous for the tow vehicle operator to view the hitch members during the alignment process, thereby making the coupling process more efficient. Devices are known in the prior art for mounting a mirror to the top of a tailgate. While they are useful for pick-up trucks, they cannot be adapted to other types of vehicles. Another limitation is present as well since many of these devices use frictional contact to hold them against the painted surfaces of the tailgate. As the vehicle moves, the clamping forces exerted by these devices may damage the vehicle's paint finish.

Accordingly, a need remains for a detachable trailer winch mirror apparatus in order to overcome the above noted shortcomings. The present invention satisfies such a need by providing a detachable mirror that is easy to use, versatile in function, safe and convenient. Such a mirror advantageously gives an operator the peace of mind that their winch is operating properly by providing a clear view thereof. This eliminates the need for a second individual to observe the winch during operating conditions while also preventing damage to such expensive winch equipment. Such a detachable mirror apparatus is also easily adaptable to use on the rear of a vehicle to ensure the proper alignment of a towing hitch with a trailer.

BRIEF SUMMARY OF THE INVENTION

In view of the foregoing background, it is therefore an object of the present invention to provide a detachable winch mirror apparatus. These and other objects, features, and advantages of the invention are provided by an apparatus for assisting an operator to view an object disposed along a secondary line of sight offset from the operator's primary line of sight such that the operator can remotely maneuver a trailer winch via a controller housed within the vehicle.

The apparatus includes an inverted U-shaped frame including a primary female section and a pair of oppositely spaced male leg sections adjustably engaged with the primary section such that a height of the frame can advantageously be altered as desired by the operator. Such a primary section may be provided with a plurality of apertures spaced apart along a linear path and preferably includes a tapered lower end portion converging downwardly along the linear path such that the primary section can be freely pivoted along an arcuate path while the leg sections are maintained at a stationary position respectively.

The leg sections are preferably each provided with a spring-operable detent fixedly secured thereto and extending outwardly such that the detents can be selectively positioned through the apertures while being displaced along the linear paths respectively. Each leg section has a linear shape and is provided with a longitudinal axis equidistantly spaced apart such that the leg sections travel substantially parallel to each other. A mechanism is included for removably securing the frame to a selected portion of the vehicle such that the frame can be maintained at a non-vertical position extending away from an outer surface of the vehicle.

The present invention further includes a mechanism for identifying the object lying within the second line of sight by effectively reflecting an image of the object onto the first line of sight such that the operator can advantageously readily identify the object while seated within the vehicle. Such an identifying mechanism is advantageously selectively positional at various angles offset from a vertical plane.

The identifying mechanism preferably includes a mirror that has a substantially planar front surface including a frame secured about a perimeter of the front surface. A plurality of threaded fastening members are adjustably connected to the mirror frame and the primary section respectively such that the mirror can conveniently be supported above a ground surface while medially disposed between the leg sections.

Such fastening members preferably include a plurality of threaded bolts having opposed end portions threadably secured to the mirror frame and the primary section respectively. A plurality of wing-nuts are threadably positionable about the bolts respectively and a plurality of rigid washers are located intermediate of the mirror frame and the wing-nuts respectively such that the wing-nuts can be maintained at a substantially stable and fixed position after the mirror frame is biased to a selected position.

In a preferred embodiment, the leg sections may be provided with lower end portions that have a threaded bore axially formed therein. The securing mechanism preferably includes a plurality of magnetic anchor members each including a threaded fastener extending upwardly therefrom along a vertical plane such that the anchor members can be removably secured to the leg sections via the threaded bores respectively.

In an alternate embodiment, the leg sections are provided with lower end portions each having a threaded bore axially formed therein. The securing mechanism includes a plurality of stop members secured to the lower end portions for terminating a length of the bores respectively. A plurality of suction cups formed from resilient material are included such that the operator may removably attach the apparatus to the vehicle by firmly pressing the leg sections onto the outer vehicle surface. Each of the suction cups is provided with a lip portion for receiving and maintaining a threaded fastener at a fixed upright position such that the threaded fasteners can be adjustably connected to the leg sections via the threaded bores respectively.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is an enlarged perspective view of the apparatus shown in FIG. 1;

FIG. 3 is a side elevational view of the apparatus shown in FIG. 2, showing the suction cups attached thereto;

FIG. 4 is a cross-sectional view of the apparatus shown in FIG. 2, showing the magnetic anchor members; and FIG. 5 is a cross-sectional view of the apparatus shown in FIG. 3, showing the suction cups.

DETAILED DESCRIPTION OF THE INVENTION

Figure 1:
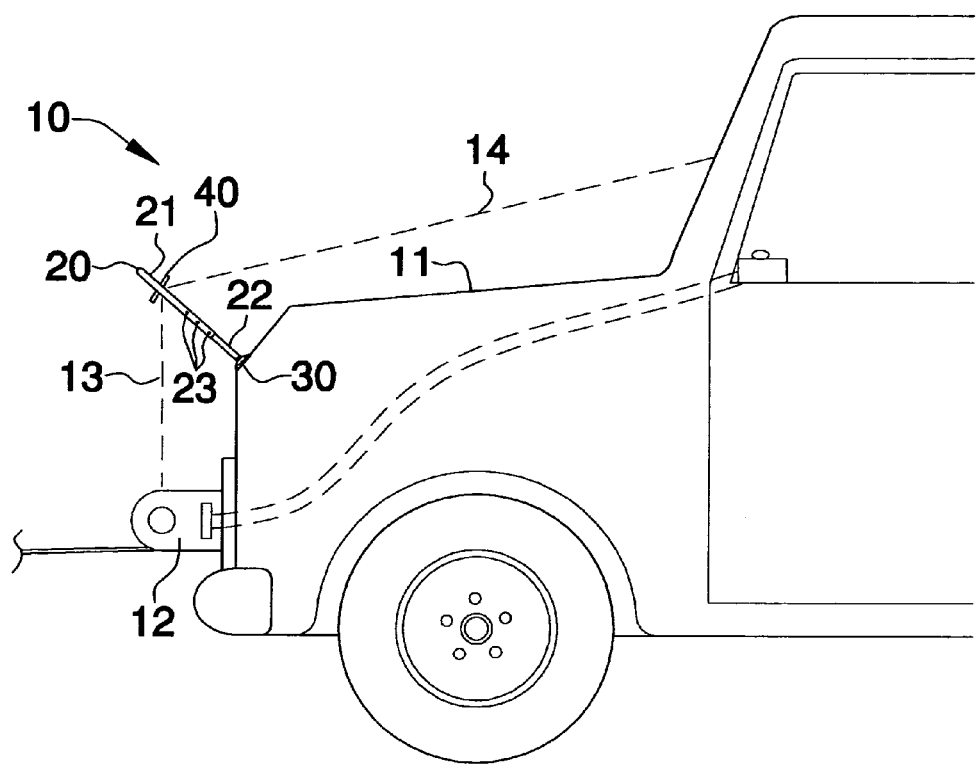
FIG. 1 is a side elevational view showing a detachable trailer winch mirror apparatus, in accordance with the present invention.

The present invention will now be described more fully hereinafter with reference to the accompanying drawings, in which preferred embodiments of the invention are shown. This invention may, however, be embodied in many different forms and should not be construed as limited to the embodiment set forth herein. Rather, these embodiments are provided so that this application will be thorough and complete, and will fully convey the true scope of the invention to those skilled in the art. Like numbers refer to like elements throughout the figures and prime and double prime numbers refer to like elements in alternate embodiments.

The apparatus of this invention is referred to generally in FIGS. 1–5 by the reference numeral 10 and is intended to provide a detachable trailer winch mirror apparatus. It should be understood that the apparatus 10 may be used to provide a line of site at many different locations on a vehicle and should not be limited to use for only winch viewing.

Referring initially to FIG. 1, the apparatus 10 includes an inverted U-shaped frame 20 including a primary female section 21 and a pair of oppositely spaced male leg sections 22 adjustably engaged with the primary section 21 such that a height of the frame 20 can advantageously be altered as desired by the operator and an optimum line of sight may be attained. Such a primary section 21 is provided with a plurality of apertures 23 spaced apart along a linear path and includes a tapered lower end portion 24 converging downwardly along the linear path such that the primary section 21 can be freely pivoted along an arcuate path while the leg sections 22 are maintained at a stationary position respectively, further improving the view of objects 12 positioned out of the operator's direct line of sight.

The leg sections 22 are each provided with a spring-operable detent 25 fixedly secured thereto and extending outwardly such that the detents 25 can be selectively positioned through the apertures 23 while being displaced along the linear paths respectively. Each leg section 22 has a linear shape and is provided with a longitudinal axis equidistantly spaced apart such that the leg sections 22 travel substantially parallel to each other.

Referring to FIGS. 2 through 5, a mechanism 30 is included for removably securing the frame 20 to a selected portion of the vehicle 11 such that the frame 20 can be maintained at a non-vertical position extending away from an outer surface of the vehicle 11.

Referring to FIGS. 2 and 4, in a preferred embodiment 10, the leg sections 22 are provided with lower end portions that have a threaded bore 26 axially formed therein. The securing mechanism 30 includes a plurality of magnetic anchor members 31 each including a threaded fastener 32 extending upwardly therefrom along a vertical plane such that the anchor members 31 can be removably secured to the leg sections 22 via the threaded bores 26 respectively.

Referring to FIGS. 3 and 5, in an alternate embodiment 10', the leg sections 22 are provided with lower end portions each having a threaded bore 26 axially formed therein. The securing mechanism 30' includes a plurality of stop members 33 secured to the lower end portions for terminating a length of the bores 26 respectively. A plurality of suction cups 34 formed from resilient material are included such that the operator may removably attach the apparatus 10 to the vehicle 11 by firmly pressing the leg sections 22 onto the outer vehicle surface. Such suction cups 34 advantageously allow a user to attach the apparatus 10 to a variety of different surfaces because the resilient nature of their construction causes no damage to those surfaces. Each of the suction cups 34 is provided with a lip portion 35 for receiving and maintaining a threaded fastener 36 at a fixed upright position such that the threaded fasteners 36 can be adjustably connected to the leg sections 22 via the threaded bores 26 respectively.

Referring to FIGS. 1 through 3, the present invention further includes a mechanism 40 for identifying the object 12 lying within the second line 13 of sight by effectively reflecting an image of the object onto the first line of sight 14 such that the operator can advantageously readily identify the object while seated within the vehicle 11. Such an identifying mechanism 40 is advantageously selectively positional at various angles offset from a vertical plane. This feature advantageously allows an operator to adapt the position of the identifying mechanism 40 such that the apparatus 10 may be used to optimally view objects in different locations.

Referring to FIG. 2, the identifying mechanism 40 includes a mirror 41 that has a substantially planar front surface 42 including a frame 43 secured about a perimeter of the front surface 42. A plurality of threaded fastening members 44 are adjustably connected to the mirror frame 43 and the primary section 21 respectively such that the mirror 41 can conveniently be supported above a ground surface while medially disposed between the leg sections.

Still referring to FIG. 2, such fastening members 44 include a plurality of threaded bolts 45 having opposed end portions threadably secured to the mirror frame 43 and the primary section 21 respectively. A plurality of wing-nuts 46 are threadably positionable about the bolts 45 respectively and a plurality of rigid washers 47 are located intermediate of the mirror frame 43 and the wing-nuts 46 respectively such that the wing-nuts 46 can be maintained at a substantially stable and fixed position after the mirror frame 43 is biased to a selected position. This feature advantageously ensures that the position of the mirror frame 43 does not change during operating conditions, causing the operator to lose sight of the desired object and rendering the apparatus 10 virtually useless.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An apparatus for assisting an operator to view an object disposed along a secondary line of sight offset from the operator's primary line of sight such that the operator can remotely maneuver a trailer winch via a controller housed within the vehicle, said apparatus comprising:
a frame including a primary section and a pair of oppositely spaced leg sections adjustably engaged with said primary section such that a height of said frame can be altered as desired by the operator, each said leg section having a linear shape and being provided with a longitudinal axis equidistantly spaced apart such that said leg sections travel substantially parallel to each other;
means for removably securing said frame to a selected portion of the vehicle such that said frame can be maintained at a non-vertical position extending away from an outer surface of the vehicle; and
means for identifying the object lying within the second line of sight by reflecting an image of the object onto the first line of sight such that the operator can readily identify the object while seated within the vehicle, wherein said identifying means is selectively positional at various angles offset from a vertical plane;
wherein said leg sections are provided with lower end portions having a threaded bore axially formed therein, said securing means comprising
a plurality of magnetic anchor members each including a threaded fastener extending upwardly therefrom along a vertical plane such that said anchor members can be removably secured to said leg sections via the threaded bores respectively.

2. The apparatus of claim 1, wherein said identifying means comprises:
a mirror having a substantially planar front surface and including a frame secured about a perimeter of said front surface; and
a plurality of threaded fastening members adjustably connected to said mirror frame and said primary section respectively such that said mirror can be supported above a ground surface while medially disposed between said leg sections.

3. The apparatus of claim 2, wherein said fastening members comprise:
a plurality of threaded bolts having opposed end portions threadably secured to said mirror frame and said primary section respectively;
a plurality of wing-nuts threadably positionable about said bolts respectively; and
a plurality of rigid washers located intermediate of said mirror frame and said wing-nuts respectively such that said wing-nuts can be maintained at a substantially stable and fixed position after said mirror frame is biased to a selected position.

4. The apparatus of claim 1, wherein said primary section is provided with a plurality of apertures spaced apart along a linear path, said leg sections each being provided with a spring-operable detent fixedly secured thereto and extending outwardly such that said detents can be selectively positioned through the apertures while being displaced along the linear paths respectively.

5. The apparatus of claim 1, wherein said leg sections are provided with lower end portions each having a threaded bore axially formed therein, said securing means comprising:
a plurality of stop members secured to said lower end portions for terminating a length of the bores respectively; and
a plurality of suction cups formed from resilient material such that the operator may removably attach said apparatus to the vehicle by firmly pressing said leg sections onto the outer vehicle surface, each said suction cup being provided with a lip portion for receiving and maintaining a threaded fastener at a fixed upright position such that the threaded fasteners can be adjustably connected to said leg sections via the threaded bores respectively, said primary section including a tapered lower end portion converging downwardly along the linear path such that said primary section can be freely pivoted along an arcuate path while said leg sections are maintained at a stationary position respectively.

6. An apparatus for assisting an operator to view an object disposed along a secondary line of sight offset from the operator's primary line of sight such that the operator can remotely maneuver a trailer winch via a controller housed within the vehicle, said apparatus comprising:
an inverted U-shaped frame including a primary section and a pair of oppositely spaced leg sections adjustably engaged with said primary section such that a height of said frame can be altered as desired by the operator, each said leg section having a linear shape and being provided with a longitudinal axis equidistantly spaced apart such that said leg sections travel substantially parallel to each other;

means for removably securing said frame to a selected portion of the vehicle such that said frame can be maintained at a non-vertical position extending away from an outer surface of the vehicle; and means for identifying the object lying within the second line of sight by reflecting an image of the object onto the first line of sight such that the operator can readily identify the object while seated within the vehicle, wherein said identifying means is selectively positional at various angles offset from a vertical plane;

wherein said leg sections are provided with lower end portions having a threaded bore axially formed therein, said securing means comprising a plurality of magnetic anchor members each including a threaded fastener extending upwardly therefrom along a vertical plane such that said anchor members can be removably secured to said leg sections via the threaded bores respectively.

7. The apparatus of claim 6, wherein said identifying means comprises:

a mirror having a substantially planar front surface and including a frame secured about a perimeter of said front surface; and a plurality of threaded fastening members adjustably connected to said mirror frame and said primary section respectively such that said mirror can be supported above a ground surface while medially disposed between said leg sections.

8. The apparatus of claim 7, wherein said fastening members comprise:

a plurality of threaded bolts having opposed end portions threadably secured to said mirror frame and said primary section respectively;

a plurality of wing-nuts threadably positionable about said bolts respectively; and a plurality of rigid washers located intermediate of said mirror frame and said wing-nuts respectively such that said wing-nuts can be maintained at a substantially stable and fixed position after said mirror frame is biased to a selected position.

9. The apparatus of claim 6, wherein said primary section is provided with a plurality of apertures spaced apart along a linear path, said leg sections each being provided with a spring-operable detent fixedly secured thereto and extending outwardly such that said detents can be selectively positioned through the apertures while being displaced along the linear paths respectively.

10. The apparatus of claim 6, wherein said leg sections are provided with lower end portions each having a threaded bore axially formed therein, said securing means comprising:

a plurality of stop members secured to said lower end portions for terminating a length of the bores respectively; and a plurality of suction cups formed from resilient material such that the operator may removably attach said apparatus to the vehicle by firmly pressing said leg sections onto the outer vehicle surface, each said suction cup being provided with a lip portion for receiving and maintaining a threaded fastener at a fixed upright position such that the threaded fasteners can be adjustably connected to said leg sections via the threaded bores respectively, said primary section including a tapered lower end portion converging downwardly along the linear path such that said primary section can be freely pivoted along an arcuate path while said leg sections are maintained at a stationary position respectively.

11. An apparatus for assisting an operator to view an object disposed along a secondary line of sight offset from the operator's primary line of sight such that the operator can remotely maneuver a trailer winch via a controller housed within the vehicle, said apparatus comprising:

an inverted U-shaped frame including a primary female section and a pair of oppositely spaced male leg sections adjustably engaged with said primary section such that a height of said frame can be altered as desired by the operator, each said leg section having a linear shape and being provided with a longitudinal axis equidistantly spaced apart such that said leg sections travel substantially parallel to each other;

means for removably securing said frame to a selected portion of the vehicle such that said frame can be maintained at a non-vertical position extending away from an outer surface of the vehicle; and means for identifying the object lying within the second line of sight by reflecting an image of the object onto the first line of sight such that the operator can readily identify the object while seated within the vehicle, wherein said identifying means is selectively positional at various angles offset from a vertical plane;

wherein said leg sections are provided with lower end portions having a threaded bore axially formed therein, said securing means comprising a plurality of magnetic anchor members each including a threaded fastener extending upwardly therefrom along a vertical plane such that said anchor members can be removably secured to said leg sections via the threaded bores respectively.

12. The apparatus of claim 11, wherein said identifying means comprises:

a mirror having a substantially planar front surface and including a frame secured about a perimeter of said front surface; and a plurality of threaded fastening members adjustably connected to said mirror frame and said primary section respectively such that said mirror can be supported above a ground surface while medially disposed between said leg sections.

13. The apparatus of claim 12, wherein said fastening members comprise:

a plurality of threaded bolts having opposed end portions threadably secured to said mirror frame and said primary section respectively;

a plurality of wing-nuts threadably positionable about said bolts respectively; and a plurality of rigid washers located intermediate of said mirror frame and said wing-nuts respectively such that said wing-nuts can be maintained at a substantially stable and fixed position after said mirror frame is biased to a selected position.

14. The apparatus of claim 11, wherein said primary section is provided with a plurality of apertures spaced apart along a linear path, said leg sections each being provided with a spring-operable detent fixedly secured thereto and extending outwardly such that said detents can be selectively positioned through the apertures while being displaced along the linear paths respectively.

15. The apparatus of claim 11, wherein said leg sections are provided with lower end portions each having a threaded bore axially formed therein, said securing means comprising:
- a plurality of stop members secured to said lower end portions for terminating a length of the bores respectively; and
- a plurality of suction cups formed from resilient material such that the operator may removably attach said apparatus to the vehicle by firmly pressing said leg sections onto the outer vehicle surface, each said suction cup being provided with a lip portion for receiving and maintaining a threaded fastener at a fixed upright position such that the threaded fasteners can be adjustably connected to said leg sections via the threaded bores respectively, said primary section including a tapered lower end portion converging downwardly along the linear path such that said primary section can be freely pivoted along an arcuate path while said leg sections are maintained at a stationary position respectively.

\* \* \* \* \*